(12) United States Patent
Yoda et al.

(10) Patent No.: US 10,500,883 B2
(45) Date of Patent: Dec. 10, 2019

(54) COMBINATION OF INTERMEDIATE TRANSFER SHEET AND THERMAL TRANSFER MEDIUM, AND PRINT FORMING METHOD

(71) Applicant: Dai Nippon Printing Co., Ltd., Tokyo (JP)

(72) Inventors: Shinya Yoda, Tokyo (JP); Emi Matsuba, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 16/077,816

(22) PCT Filed: Feb. 23, 2017

(86) PCT No.: PCT/JP2017/006843
§ 371 (c)(1),
(2) Date: Aug. 14, 2018

(87) PCT Pub. No.: WO2017/146151
PCT Pub. Date: Aug. 31, 2017

(65) Prior Publication Data
US 2019/0160846 A1      May 30, 2019

(30) Foreign Application Priority Data

Feb. 25, 2016 (JP) ................................ 2016-034793

(51) Int. Cl.
*B41M 5/382* (2006.01)
*B32B 7/06* (2019.01)
(Continued)

(52) U.S. Cl.
CPC .......... *B41M 5/38214* (2013.01); *B32B 7/06* (2013.01); *B32B 27/20* (2013.01); *B32B 27/30* (2013.01);
(Continued)

(58) Field of Classification Search
CPC .... B41J 2/0057; B41J 2/325; B41M 5/38214; B41M 5/42; B32B 7/06; B32B 27/30; B32B 27/40
See application file for complete search history.

(56) References Cited

U.S. PATENT DOCUMENTS 4,923,848 A    5/1990 Akada et al.
6,214,149 B1 * 4/2001 Nakano ................. B41M 5/345
                                                  156/235
(Continued)

FOREIGN PATENT DOCUMENTS

JP    S62-238791 A1   10/1987
JP    2001-080224 A1   3/2001
(Continued)

OTHER PUBLICATIONS

International Search Report and Written Opinion (Application No. PCT/JP2017/006843) dated Apr. 4, 2017.

*Primary Examiner* — Lamson D Nguyen
(74) *Attorney, Agent, or Firm* — Burr & Brown, PLLC

(57) ABSTRACT

A thermal transfer sheet and intermediate transfer medium, and a print forming method, capable of forming a thermal transfer image having good transferability when transferring a transfer layer including a receiving layer onto a transfer receiving article, and capable of improving the durability of a print obtained by transferring the transfer layer including the receiving layer, on which the thermal transfer image has been formed, onto a transfer receiving article. The thermal transfer sheet includes a substrate, primer layer and colorant layer, wherein the primer layer contains one or more selected from the group consisting of particles derived from colloidal inorganic particles, polyvinyl alcohol resins, polyvinyl pyrrolidone resins, and polyurethane resins. The intermediate transfer medium includes another substrate, a protective (Continued)

layer, and a receiving layer, wherein the protective layer and the receiving layer are layered in this order on one surface of the another substrate.

8 Claims, 2 Drawing Sheets

(51) Int. Cl.

| | | |
|---|---|---|
| B32B 27/20 | (2006.01) | |
| B32B 27/30 | (2006.01) | |
| B32B 27/40 | (2006.01) | |
| B41M 5/42 | (2006.01) | |
| B41M 5/44 | (2006.01) | |
| B41M 5/52 | (2006.01) | |
| B41J 2/325 | (2006.01) | |
| B41J 2/005 | (2006.01) | |
| B41M 5/46 | (2006.01) | |
| B41M 5/392 | (2006.01) | |
| B41M 5/41 | (2006.01) | |

(52) U.S. Cl.
CPC ............. *B32B 27/40* (2013.01); *B41J 2/0057* (2013.01); *B41J 2/325* (2013.01); *B41M 5/42* (2013.01); *B41M 5/44* (2013.01); *B41M 5/46* (2013.01); *B41M 5/52* (2013.01); *B41M 5/392* (2013.01); *B41M 5/41* (2013.01); *B41M 5/426* (2013.01); *B41M 5/5236* (2013.01); *B41M 5/5254* (2013.01); *B41M 5/5272* (2013.01); *B41M 2205/30* (2013.01); *B41M 2205/32* (2013.01); *B41M 2205/38* (2013.01)

(56) References Cited

U.S. PATENT DOCUMENTS

| | | | |
|---|---|---|---|
| 6,284,708 B1 * | 9/2001 | Oshima | B41M 7/0027 156/235 |
| 2008/0274310 A1 | 11/2008 | Fukui et al. | |
| 2013/0164463 A1 | 6/2013 | Yoda et al. | |
| 2018/0079245 A1 * | 3/2018 | Yoneyama | B41M 5/42 |

FOREIGN PATENT DOCUMENTS

| | | |
|---|---|---|
| JP | 2006-150956 A1 | 6/2006 |
| JP | 2010-234733 A1 | 10/2010 |
| JP | 2012-071545 A1 | 4/2012 |
| JP | 2012-196852 A1 | 10/2012 |
| JP | 2012-206351 A1 | 10/2012 |
| JP | 2013-035192 A1 | 2/2013 |
| JP | 2014-054775 A1 | 3/2014 |

* cited by examiner

Thermal transfer image X

Thermal transfer image X

COMBINATION OF INTERMEDIATE TRANSFER SHEET AND THERMAL TRANSFER MEDIUM, AND PRINT FORMING METHOD

TECHNICAL FIELD

The present invention relates to a combination of a thermal transfer sheet and an intermediate transfer medium, and a print forming method.

BACKGROUND ART

Conventionally, thermal transfer method has been widely used as a simple printing method. The thermal transfer method is an image forming method wherein a thermal transfer sheet which is provided with a colorant layer formed on a surface of a substrate sheet thereof is superposed on a thermal transfer image-receiving sheet which is provided with a receiving layer, then the back side of the thermal transfer sheet is heated by a heating means such as a thermal head with a shape of an intended image, and thereby the colorant included in the colorant layer is selectively transferred to the thermal transfer image-receiving sheet to form the image on the receiving layer of the thermal transfer image-receiving sheet.

The thermal transfer method may be divided into two methods, i.e., melt-transfer method and sublimation transfer method. The melt-transfer method is an image forming method wherein a thermal transfer sheet, in which a thermally fusible ink layer comprising a colorant, such as a pigment, and a binder for dissolving or dispersing the colorant, such as a thermally fusible wax or resin, is carried on a substrate sheet, is used; then, an energy in accordance with image information is applied to the thermal transfer sheet by a heating means such as a thermal head; and thereby the colorant is transferred onto the thermal transfer image-receiving sheet, such as a plastic sheet or paper, together with the binder. The image formed by the melt-transfer method is suitable for recording binary images such as characters, since the image has excellent sharpness and high concentration.

On the other hand, the sublimation transfer method is another image forming method wherein a thermal transfer sheet, in which a colorant layer comprising a colorant which is able to be transferred thermally by sublimation, and a resin binder for dissolving or dispersing the colorant, is carried on a substrate sheet, is used; then, an energy in accordance with image information is applied to the thermal transfer sheet by a heating means such as a thermal head; and thereby only the colorant is transferred (diffusion-transferred) onto a substrate sheet, such as a plastic sheet or paper, or onto a thermal transfer image-receiving sheet which is optionally provided with a receiving layer. With respect to the sublimation transfer method, since the transferring amount of colorant can be controlled by the amount of energy applied, it is possible to form a gray-scale image in which image density is controlled. In addition, since the colorants used are dyes, the image formed has transparency. Thus, when dyes of different colors are superposed, the reproducibility of neutral tints becomes excellent. Therefore, when using thermal transfer sheets of different colors such as yellow, magenta, cyan, black or the like, and transferring dye of each color on the thermal transfer image-receiving sheet so as to superpose the dyes each other, it is possible to form a photographic full-color image of high quality in which reproducibility of neutral tints is excellent.

Along by the development of various hardware and software related to multimedia, this thermal transferring method has been expanding its market as a full-color hard copy system for digital images represented by computer graphics, satellite static images, CD-ROM or the like, and for analog images such as video. The thermal transfer image-receiving sheet according to the thermal transfer method includes a wide range of concrete applications. As typical examples, proof printing; image output; output of plan or design, such as those drawn by CAD/CAM, etc.; output use for various medical analytical or measuring instruments such as CT scan, endoscopic camera, etc.; and a substitute for instant photos; as well as, output of picture of face to an identification paper or ID card, credit card, or other cards; and applications as composite photograph or souvenir picture at an amusement facilities such as amusement park, amusement arcade, museum, and aquarium, etc., can be mentioned.

With the diversification of use of the above-mentioned thermal transfer image-receiving sheet, there is an increasing demand for forming a thermal transfer image on an arbitrary object. As the object for forming the thermal transfer image, a purpose-built thermal transfer image-receiving sheet which is provided with a receiving layer on the substrate is usually utilized. However, in this case, the substrate or the like subjects to some type of constraints. Under these circumstances, Patent literature 1 discloses an intermediate transfer medium in which the receiving layer is provided on the substrate so that the receiving layer can be peeled off from the substrate. According to the intermediate transfer medium, by transferring the colorant of the colorant layer included in a thermal transfer sheet to the receiving layer so as to form a thermal transfer image, and then heating the intermediate transfer medium, it is possible to transfer the receiving layer onto which the colorant has been transferred to an arbitrary transfer receiving article. Thus, it becomes possible to form a thermal transfer image without concern for the constraints about the kind of transfer receiving article.

A print having a high-density thermal transfer image is highly demanded these days, and in response to this demand, a method is used wherein the amount of colorant transferred from the colorant layer to the receiving layer of a thermal transfer sheet is large. The amount of colorant transferred from the colorant layer to the receiving layer of a thermal transfer sheet varies according to the amount of energy applied to the back face side of the thermal transfer sheet during the formation of a thermal transfer image, and the larger the amount of energy is, the larger the amount of colorant transferred onto the receiving layer is. Accordingly, it is the current situation that, in response to the above-mentioned demand, the amount of energy applied to the back face side of the thermal transfer sheet has to be increased to form a high-density thermal transfer image on the receiving layer.

When the amount of energy applied to the back face side of the thermal transfer sheet is increased to form a high-density thermal transfer image on the receiving layer, the receiving layer is thermally damaged. Formation of a print by using an intermediate transfer medium requires transfer of the receiving layer, on which a thermal transfer image has been formed, onto a transfer receiving article after formation of the thermal transfer image on the receiving layer as described above. Thus, if the receiving layer is thermally damaged during formation of the thermal transfer image, transferability when transferring the receiving layer, on which the thermal transfer image has been formed, onto a transfer receiving article is lowered, or in other words, the problem of lowered adhesion between the transfer receiving article and the receiving layer on which the thermal transfer image has been formed arises. In addition, due to the lowered adhesion between the transfer receiving article and the receiving layer on which the thermal transfer image has been formed, a solvent or the like is likely to enter through the interface between the transfer receiving article and the thermal transfer image, problems such as poor durability of the formed print are likely to arise as well.

CITATION LIST

Patent Literature

Patent Literature 1: JP SH062-238791 A

SUMMARY OF INVENTION

Technical Problem

The present invention has been made in view of the above-mentioned circumstances, and the present invention aims principally to provide a combination of a thermal transfer sheet and an intermediate transfer medium, and a print forming method, capable of forming a thermal transfer image on a receiving layer of an intermediate transfer medium without application of a large amount of energy, and capable of exerting improved transferability when transferring the receiving layer, on which the thermal transfer image has been formed, onto a transfer receiving article as well as the durability of a print obtained by transferring the receiving layer, on which the thermal transfer image has been formed, onto the transfer receiving article.

Solution to Problem

The present invention for solving the above-mentioned problems is a combination of a thermal transfer sheet and an intermediate transfer medium, the thermal transfer sheet including a substrate, a primer layer, and a colorant layer, wherein the primer layer and the colorant layer are layered in this order on one surface of the substrate, and wherein the primer layer contains one or more selected from the group consisting of particles derived from colloidal inorganic particles, polyvinyl alcohol resins, polyvinyl pyrrolidone resins, and polyurethane resins, and the intermediate transfer medium including another substrate, a protective layer, and a receiving layer, wherein the protective layer and the receiving layer are layered in this order on one surface of the another substrate.

Further, the receiving layer of the intermediate transfer medium may contain a resin having a number average molecular weight (Mn) of not less than 6000 and not more than 35000, and may contain a resin having a glass transition temperature (Tg) of not less than 60° C. and not more than 100° C. Furthermore, the receiving layer of the intermediate transfer medium may contain a release agent in an amount of not more than 15% by mass on the basis of the total mass of the receiving layer.

In addition, the present invention for solving the above-mentioned problems is a print forming method including a step of providing: a thermal transfer sheet including a substrate, a primer layer, and a colorant layer, wherein the primer layer and the colorant layer are layered in this order on one surface of the substrate; an intermediate transfer medium including another substrate, a protective layer, and a receiving layer, wherein the protective layer and the receiving layer are layered in this order on one surface of the another substrate; and a transfer receiving article; a thermal transfer image forming step of transferring a colorant contained in the colorant layer of the thermal transfer sheet onto the receiving layer of the intermediate transfer medium to form a thermal transfer image on the receiving layer; and a print forming step of transferring the receiving layer, on which the thermal transfer image has been formed, onto the transfer receiving article together with the protective layer, wherein the primer layer of the thermal transfer sheet used to form the thermal transfer image contains one or more selected from the group consisting of particles derived from colloidal inorganic particles, polyvinyl alcohol resins, polyvinyl pyrrolidone resins, and polyurethane resins.

Further, the receiving layer of the intermediate transfer medium may contain a resin having a number average molecular weight (Mn) of not less than 6000 and not more than 35000, and may contain a resin having a glass transition temperature (Tg) of not less than 60° C. and not more than 100° C. Furthermore, the receiving layer of the intermediate transfer medium may contain a release agent in an amount of not more than 15% by mass on the basis of the total mass of the receiving layer.

Advantageous Effects of Invention

According to the combination of a thermal transfer sheet and an intermediate transfer medium and the print forming method of the present invention, it is possible to form a thermal transfer image on a receiving layer of an intermediate transfer medium without application of a large amount of energy, and improve transferability exerted when transferring the receiving layer, on which the thermal transfer image has been formed, onto a transfer receiving article as well as the durability of a print obtained by transferring the receiving layer, on which the thermal transfer image has been formed, onto the transfer receiving article.

DESCRIPTION OF EMBODIMENTS

«Combination of Thermal Transfer Sheet and Intermediate Transfer Medium»

A combination of a thermal transfer sheet and an intermediate transfer medium according to one embodiment of the present invention (hereinafter referred to as a combination of one embodiment) will be described below with reference to the drawings.

<Thermal Transfer Sheet>

Figure 1:
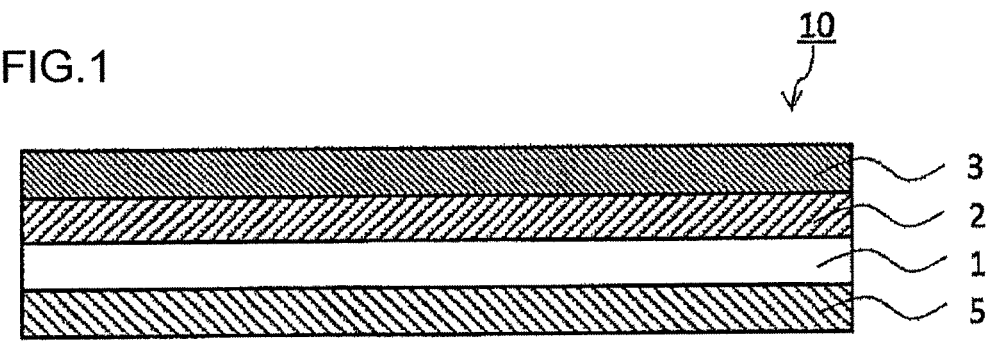
FIG. 1 is a schematic sectional view showing an embodiment of the thermal transfer sheet used in the combination of the present invention.
Figure 2:
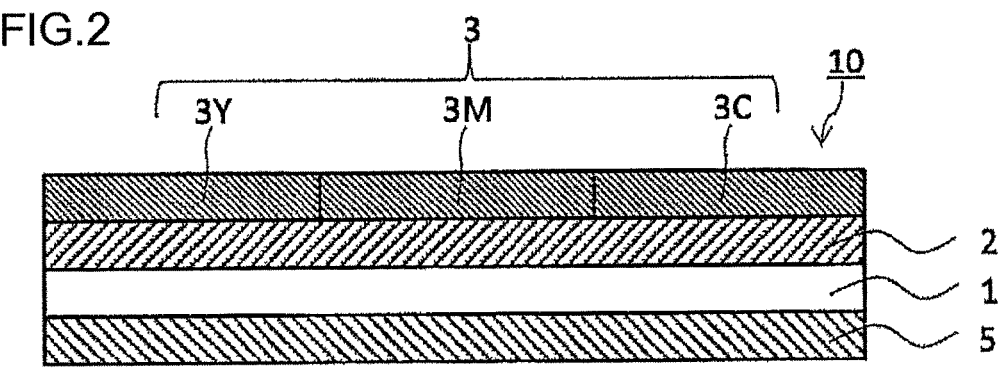
FIG. 2 is a schematic sectional view showing another embodiment of the thermal transfer sheet used in the combination of the present invention.

First, the thermal transfer sheet used in the combination of one embodiment will now be described. As shown in FIGS. 1 and 2, a thermal transfer sheet 10 used in the combination of one embodiment (hereinafter sometimes simply referred to as a "thermal transfer sheet") has a structure wherein a primer layer 2 and a colorant layer 3 are layered in this order on one surface of a substrate 1. In the depicted embodiment, a back face layer 5 is provided on the other surface of the substrate 1. The substrate 1, the primer layer 2, and the colorant layer 3 are essential constituents of the thermal transfer sheet 10 used in the combination of one embodiment, and the back face layer 5 is an optional constituent. In the embodiment shown in FIG. 1, one colorant layer 3 is provided on one surface of the substrate 1 via the primer layer 2, and as shown in FIG. 2, a plurality of colorant layers 3 (3M, 3C, and 3Y in the depicted embodiment) can also be layered in parallel on the substrate 1 via the primer layer 2 across one surface of the substrate 1. FIGS. 1 and 2 are schematic sectional views of the thermal transfer sheet 10 used in the combination of one embodiment. Next, the respective constituents of the thermal transfer sheet 10 used in the combination of one embodiment will now be described.

(Substrate)

The substrate 1 is an essential constituent of the thermal transfer sheet 10 used in the combination of one embodiment and supports the primer layer 2 provided on one surface of the substrate 1 and the back face layer 5 optionally provided on the other surface of the substrate 1. There is no particular limitation to the material of the substrate 1, and examples include various plastic films or sheets of polyethylene terephthalate and like polyesters, polyarylate, polycarbonate, polyurethane, polyimide, polyether imide, cellulose derivatives, polyethylene, ethylene-vinyl acetate copolymers, polypropylene, polystyrene, acryl, polyvinyl chloride, polyvinylidene chloride, polyvinyl alcohol, polyvinyl butyral, nylon, polyether ether ketone, polysulfone, polyethersulfone, tetrafluoroethylene-perfluoroalkyl vinyl ether copolymers, polyvinylfluoride, tetrafluoroethylene-ethylene copolymers, tetrafluoroethylene-hexafluoropropylene copolymers, polychlorotrifluoroethylene, polyvinylidenefluoride, and the like.

Although there is no particular limitation to the thickness of the substrate 1, the substrate 1 is usually in the range of not less than 2 µm and not more than 100 µm and preferably not less than 1 µm and not more than 10 µm in thickness.

A substrate the surface of which on the primer layer 2 side has undergone an adhesion treatment can also be used as the substrate 1. As the adhesion treatment, known resin surface modification techniques such as corona discharge treatment, flame treatment, ozone treatment, ultraviolet treatment, radiation treatment, surface roughening treatment, chemical treatment, plasma treatment, low-temperature plasma treatment, and grafting treatment can be applied as they are. Two or more of these treatments can also be used in combination.

(Primer Layer)

As shown in FIGS. 1 and 2, the primer layer 2 is provided on one surface of the substrate 1 (on the upper-surface side of the substrate 1 in the depicted embodiment). The primer layer 2 is an essential constituent of the thermal transfer sheet 10 used in the combination of one embodiment.

The thermal transfer sheet 10 used in the combination of one embodiment is used to form a thermal transfer image on a receiving layer 53 of an intermediate transfer medium 60, which will be described below. After a thermal transfer image is formed on the receiving layer 53 of the intermediate transfer medium 60 by using the thermal transfer sheet 10, the intermediate transfer medium 60 is combined with a transfer receiving article 100, and the receiving layer 53 on which the thermal transfer image has been formed is transferred together with a protective layer 52 onto the transfer receiving article 100 to obtain a print 200. Accordingly, the intermediate transfer medium 60 used in the combination of one embodiment requires good transferability when the receiving layer 53 on which the thermal transfer image has been formed is transferred together with the protective layer 52 onto the transfer receiving article 100, or in other words, good adhesion between the transfer receiving article 100 and the receiving layer 53 on which the thermal transfer image has been formed, when the receiving layer 53 on which the thermal transfer image has been formed is transferred together with the protective layer 52 onto the transfer receiving article 100.

It is presumed that the adhesion between the transfer receiving article 100 and the receiving layer 53 on which a thermal transfer image has been formed is affected by damage the receiving layer 53 of the intermediate transfer medium 60 receives during the formation of the thermal transfer image, or in other words, when the colorant contained in the colorant layer 3 of the thermal transfer sheet is transferred, and that a greater damage to the receiving layer 53 during the formation of the thermal transfer image results in a lower adhesion between the transfer receiving article 100 and the receiving layer 53 on which the thermal transfer image has been formed. Forming a high-density image on the receiving layer 53 of the intermediate transfer medium 60 requires a large amount of energy to be applied to the back face side of the thermal transfer sheet 10 during the formation of the thermal transfer image, and forming a high-density image results in, as its adverse effect, a lowered adhesion between the transfer receiving article 100 and the receiving layer 53 on which the thermal transfer image has been formed. That is, it can be said that forming a high-density thermal transfer image on the receiving layer 53 of the intermediate transfer medium 60 and improving the adhesion between the transfer receiving article and the receiving layer 53 on which the thermal transfer image has been formed are in a trade-off relationship.

Thus, the thermal transfer sheet 10 used in the combination of one embodiment is characterized in that the primer layer 2 constituting the thermal transfer sheet 10 and disposed between the substrate 1 and the colorant layer 3 contains one or more selected from the group consisting of particles derived from colloidal inorganic particles, polyvinyl alcohol resins, polyvinyl pyrrolidone resins, and polyurethane resins. Hereinafter, particles derived from colloidal inorganic particles, polyvinyl alcohol resins, polyvinyl pyrrolidone resins, and polyurethane resins may be collectively referred to as a "group of components".

According to thermal transfer sheet 10 including the primer layer 2 having these characteristics, it is possible to form a high-density image on the receiving layer 53 of the intermediate transfer medium 60, which will be described below, without applying a large amount of energy when forming a thermal transfer image. That is, a high-density thermal transfer image can be formed on the receiving layer 53 while suppressing thermal damage to the receiving layer 53 of the intermediate transfer medium 60. Suppressing damage to the receiving layer 53 during the formation of a high-density image makes it possible to improve transferability exerted when transferring the receiving layer 53, on which the thermal transfer image has been formed, onto the transfer receiving article 100, or in other words, adhesion between the transfer receiving article 100 and the receiving layer 53 on which the thermal transfer image has been formed, and, further, improve the durability of a print obtained by transferring the receiving layer 53, on which the thermal transfer image has been formed, onto the transfer receiving article 100. Furthermore, according to the thermal transfer sheet capable of forming a high-density image on the receiving layer 53 of the intermediate transfer medium 60 described below without application of a large amount of energy, it is possible to suppress, for example, thermal fusion of the receiving layer 53 and the colorant layer 3 caused by such energy when forming a high-density image. Accordingly, it is possible to suppress, for example, abnormal transfer in which the receiving layer that should otherwise remain on the substrate side of the intermediate transfer medium is transferred to the thermal transfer sheet side when separating the colorant layer 3 from the receiving layer 53 after the thermal transfer image is formed. That is, according to the thermal transfer sheet used in the combination of one embodiment, thermal fusion or the like is suppressed, and thus it is also possible to improve releasability exerted when separating the colorant layer 3 from the receiving layer 53 after a high-density image is formed.

The mechanisms of the above-mentioned various effects provided by disposing the primer layer 2 containing the "group of components" between the substrate 1 and the colorant layer 3 as the thermal transfer sheet 10 used in the combination of one embodiment are not necessarily clear at present. It is however presumed that the primer layer 2 containing the "group of components" has good transfer sensitivity, or in other words, good energy transfer efficiency, and that due to this good transfer sensitivity, a high-density thermal transfer image can be formed without increasing the energy applied to the back face side of the thermal transfer sheet 10. When the primer layer 2 containing the "group of components" is not disposed or when a primer layer not containing the "group of components" is disposed between the substrate 1 and the colorant layer 3, the energy applied to the back face side of the thermal transfer sheet has to be increased to obtain a high-density thermal transfer image, and printing wrinkles and printing unevenness are thus likely to occur. In addition, when the primer layer 2 containing the "group of components" is not disposed between the substrate 1 and the colorant layer 3, adhesion between the substrate 1 and the colorant layer 3 is insufficient, and abnormal transfer is likely to occur in which the colorant layer 3 is caught by receiving layer 53 side during the formation of the thermal transfer image.

The primer layer 2 contains at least one from the "group of components", and may contain two or more from the "group of components". There is also no particular limitation to the content of the "group of components" contained in the primer layer 2, and irrespective of the content thereof, transfer sensitivity when forming a thermal transfer image on the receiving layer 53 can be improved in accordance with the "group of components" contained. The primer layer 2 of a preferred embodiment contains the "group of components" in an amount not less than 30% by mass in terms of the total solid content on the basis of the total solid content of the primer layer 2. When the primer layer 2 contains particles derived from colloidal inorganic particles in an amount of not less than 50% by mass in terms of the total solid content on the basis of the total solid content of the "group of components", the primer layer 2 of a preferred embodiment contains not less than 60% by mass of the "group of components" including the particles derived from colloidal inorganic particles, and, more preferably, contains not less than 81% by mass of the "group of components" including the particles derived from colloidal inorganic particles, on the basis of the total solid content of the primer layer 2. According to the thermal transfer sheet 10 having the primer layer 2 of a preferred embodiment, transfer sensitivity when forming a thermal transfer image on the receiving layer 53 can be improved, and a high-density thermal transfer image can be formed on the receiving layer 53, with a reduced energy applied to the thermal transfer sheet 10. The upper limit is not particularly limited, and is 100% by mass.

Examples of the particles derived from colloidal inorganic particles included in the "group of components" include metal silicates such as aluminum silicate and magnesium silicate; alumina, silica; metal oxides such as magnesium oxide and titanium oxide; and carbonates such as magnesium carbonate. In particular, alumina particles and silica particles, specifically alumina particles derived from alumina sol (or colloidal alumina) and silica particles derived from silica sol (or colloidal silica) are preferable particles because a further improvement in the heat resistance of the primer layer 2 and transfer sensitivity is expected.

The average particle diameter of the particles derived from colloidal inorganic particles is preferably not more than 200 nm, and particularly preferably not more than 100 nm. The average particle diameter can be obtained by a method wherein the size of primary particles is directly measured from an electron micrograph of a vertical section of the thermal transfer sheet used in the combination of one embodiment. Specifically, the diameter of the minor axis and the diameter of the major axis of each primary particle are measured, the average thereof is regarded as the particle diameter of the particle, then the volume (weight) of each of 100 or more particles is obtained by approximation to a rectangular parallelepiped having the obtained particle diameter, and the volume-average particle diameter is obtained and is regarded as the average particle diameter. The same result can be obtained also by using any of a transmission electron microscope (TEM) or a scanning electron microscope (SEM).

In order to facilitate the particles derived from colloidal inorganic particles to be dispersed in an aqueous solution in a sol form, acidic type products that have been treated by being mixed with a dispersion stabilizer such as hydrochloric acid or acetic acid, products given a positive particle charge, surface-treated products, and the like can be used.

The polyvinyl alcohol resin as referred to herein means a resin containing a vinyl alcohol polymer as a constituent thereof, and may be a homopolymer of vinyl alcohol or a copolymer with another polymerization component. When a copolymer of vinyl alcohol and another polymerization component is used as the polyvinyl alcohol resin, the copolymerization ratio of vinyl alcohol in the copolymer is preferably not less than 50%. A modified compound obtained by partially modifying polyvinyl alcohol can also be used as the polyvinyl alcohol resin.

The polyvinylpyrrolidone resin as referred to herein means a homopolymer of a vinylpyrrolidone monomer or a copolymer of a vinylpyrrolidone monomer and another monomer. For example, the polyvinylpyrrolidone resin may be a homopolymer of a vinylpyrrolidone monomer such as vinylpyrrolidone such as N-vinyl-2-pyrrolidone or N-vinyl-4-pyrrolidone, i.e., polyvinylpyrrolidone, and may be a copolymer of vinylpyrrolidone and another monomer. A vinyl monomer is suitable as another monomer. Examples of the vinyl monomer include vinyl ethers such as cyclohexyl vinyl ether, ethyl vinyl ether, hydroxyethyl vinyl ether, hydroxybutyl vinyl ether, and hydroxycyclohexyl vinyl ether, fatty acid vinyl esters such as vinyl acetate and vinyl lactate, and (meth)acrylic acid esters such as methyl (meth) acrylate, ethyl (meth)acrylate, hydroxyethyl (meth)acrylate, and hydroxypropyl (meth)acrylate, allyl ethers such as hydroxybutyl allyl ether and ethylene glycol monoallyl ether. Commercially available copolymers of vinyl pyrrolidone and a vinyl monomer can be used, and examples of commercially available copolymers of vinyl pyrrolidone and vinyl acetate include Luviskol VA28 and Luviskol VA73 of BASF.

Further, polymers containing a derivative having a substituent on the pyrrolidone ring such as N-vinyl-3-methylpyrrolidone, N-vinyl-5-methylpyrrolidone, N-vinyl-3,3,5-trimethylpyrrolidone or N-vinyl-3-benzylpyrrolidone can also be used as polyvinylpyrrolidone resins.

The polyurethane resin as referred to herein means a resin containing polyol (polyhydric alcohol) as a base and isocyanate as a cross-linking agent (a curing agent). The polyol has two or more hydroxyl groups within the molecule, and examples include polyethylene glycol, polypropylene glycol, acrylic polyol, polyester polyol, polyether polyol, and alkyd-modified acrylic polyol. The polyurethane resin may be an aqueous polyurethane resin that can be a stable dispersion in an aqueous medium such as water, a water-soluble alcohol such as isopropyl alcohol, a mixture of water and a water-soluble alcohol, or the like, or may be a solvent-based polyurethane resin that can be dissolved or dispersed in an organic solvent.

A cured product of a polyvinyl alcohol resin and a curing agent and a cured product of a polyvinylpyrrolidone resin and a curing agent can also be used as the "group of components". Examples of the curing agent include isocyanate curing agents, and metal chelating agents such as titanium chelating agents, zirconium chelating agents, and aluminum chelating agents. By allowing such a cured product to be contained in the primer layer, heat resistance can be improved, and as a result, transfer sensitivity can be further improved.

A copolymer of a polyvinyl alcohol resin and another resin, a copolymer of a polyvinyl pyrrolidone resin and another resin, and a copolymer of a polyurethane resin and another resin can also be used as the "group of components". The "copolymer" as referred to herein means a copolymer having a copolymerization ratio of the resin component included in the "group of components" of not less than 40% by mole.

The primer layer 2 may contain other components in addition to the "group of components". Examples of other components include resin components other than the resin components included in the "group of components". Examples of other resin components include polyester resins, polyvinyl acetate resins, styrene acrylate resins, polyacrylamide resins, polyamide resins, polyether resins, polystyrene resins, polypropylene resins, polyvinyl acetal resins such as polyvinyl acetoacetal and polyvinyl butyral, and like resin components. Cured products obtained by curing the above-mentioned example resin components with a curing agent can also be used as these other components.

Further, other particles other than the particles derived from colloidal inorganic particles may be contained. Examples of other particles include inorganic particles of clay minerals such as talc and kaolin, graphite, potassium nitrate, boron nitride, and the like, organic particles of acrylic resins, Teflon (registered tradename) resins, silicone resins, lauroyl resins, phenol resins, acetal resins, polystyrene resins, nylon resins, and the like, and cross-linked particles obtained by reacting these with a cross-linking agent.

In the thermal transfer sheet 10 of one embodiment in a more preferred embodiment, the primer layer 2 contains any of alumina particles derived from alumina sol, a cured product of a polyvinyl alcohol resin and a curing agent, and a polyvinyl pyrrolidone resin as the "group of components". According to the thermal transfer sheet 10 in a more preferred embodiment, it is possible to form a high-density image by a smaller amount of energy, and further suppress thermal damage to the receiving layer 53.

Although there is no particular limitation to the thickness of the primer layer 2, the primer layer 2 is preferably in the range of not less than 0.02 µm and not more than 2 µm in thickness. With the thickness of the primer layer to be in this range, it is possible to simultaneously achieve both an improvement of adhesion between the substrate 1 and the colorant layer 3 and an improvement of transfer sensitivity during the formation of a thermal transfer image.

There is also no particular limitation to the method for forming the primer layer 2, and, for example, when the "group of components" is particles derived from colloidal inorganic particles, the primer layer 2 can be formed by, for example, preparing a coating liquid for primer layer wherein silica particles or alumina particles are dispersed in an aqueous solvent or the like in a sol form, coating the substrate 1 with this coating liquid, and then drying the coating liquid. There is also no particular limitation to the coating method for the coating liquid for primer layer, and a conventionally known coating method can be suitably selected and used. Examples of the coating method include a gravure printing method, a screen printing method, and a reverse coating method using a gravure plate. Coating methods other than these can also be used. The same also applies to the coating methods for various coating liquids described below. Examples of the drying method include a method wherein an aqueous solvent is blown away by hot air drying or the like. On the other hand, when the "group of components" is a resin component such as a polyvinyl alcohol resin, a polyvinyl pyrrolidone resin, or a polyurethane resin, the primer layer 2 can be formed by preparing a coating liquid for primer layer in which these resin components are dispersed or dissolved in a suitable solvent, coating the substrate 1 with this coating liquid, and then drying the coating liquid. The primer layer 2 can also be formed by combining resin components and silica particles or alumina particles dispersed in an aqueous solvent or the like in a sol form.

(Colorant Layer)

As shown in FIGS. 1 and 2, the colorant layer 3 is provided on the primer layer 2 (on the upper-surface side of the primer layer 2 in the depicted embodiment). The colorant layer 3 is an essential constituent of the thermal transfer sheet 10 used in the combination of one embodiment, and contains a binder resin and a colorant.

Although there is no particular limitation to the colorant contained in the colorant layer 3, preferably the colorant has a sufficient color density and does not undergo discoloration or fading due to light, heat, temperature, or the like. Examples of such colorants include diarylmethane dyes, triarylmethane dyes, thiazole dyes, merocyanine dyes, pyrazolone dyes, methine dyes, indoaniline dyes, pyrazolomethine dyes, azomethine dyes such as acetophenoneazomethine, pyrazoloazomethine, imidazoleazomethine, imidazoazomethine, and pyridoneazomethine, xanthene dyes, oxazine dyes, cyanostyrene dyes such as dicyanostyrene and tricyanostyrene, thiazine dyes, azine dyes, acridine dyes, benzeneazo dyes, azo dyes such as pyridoneazo, thiopheneazo, isothiazoleazo, pyrroleazo, pyrazoleazo, imidazoleazo, thiadiazoleazo, triazoleazo, and disazo, spiropyran dyes, indolinospiropyran dyes, fluoran dyes, rhodamine lactam dyes, naphthoquinone dyes, anthraquinone dyes, and quinophthalone dyes. Specific examples include red dyes such as MSRedG (Mitsui Toatsu Chemicals Inc.), Macrolex Red Violet R (Bayer), CeresRed 7B (Bayer), and Samaron Red F3BS (Mitsubishi Chemical Corporation), yellow dyes such as Foron Brilliant Yellow 6GL (Clariant K.K.), PTY-52 (Mitsubishi Chemical Corporation), and Macrolex Yellow 6G (Bayer), blue dyes such as Kayaset (registered tradename) Blue 714 (Nippon Kayaku Co., Ltd.), Foron Brilliant Blue S-R (Clariant K.K.), MSBlue 100 (Mitsui Toatsu Chemicals Inc.), and C.I. Solvent Blue 63.

There is also no particular limitation to the binder resin, and examples include cellulose resins such as ethyl cellulose, cellulose acetate propionate, cellulose acetate butyrate, methyl cellulose, cellulose acetate, and cellulose butyrate, vinyl resins such as polyvinyl alcohol, polyvinyl acetate, polyvinyl butyral, polyvinyl acetal, and polyacrylamide, polyester resins, and phenoxy resins. In particular, when the colorant layer 3 contains a cellulose resin, releasability when separating the colorant layer 3 from the receiving layer 53 can be improved even in the case where the receiving layer of the intermediate transfer medium does not contain a release agent.

Although there is also no particular limitation to the contents of the colorant and the binder resin, the colorant layer 3 of a preferred embodiment contains a colorant in an amount of not less than 50% by mass and not more than 350% by mass, and in particular not less than 80% by mass and not more than 300% by mass, on the basis of the total mass of the binder resin. According to the colorant layer 3 of a preferred embodiment, it is possible to form a higher-density thermal transfer image in cooperation with the primer layer 2 described above. In addition, the storage stability of the thermal transfer sheet 10 used in the combination of one embodiment can be improved.

As for the method for forming the colorant layer 3, the colorant layer 3 can be formed by, for example, dispersing or dissolving the above-described colorant, binder resin, and optionally-contained other components in a suitable solvent such as toluene, methyl ethyl ketone, ethanol, isopropyl alcohol, cyclohexane, or dimethylformamide to prepare a coating liquid, coating the primer layer 2 with this coating liquid, and then drying the coating liquid. Although there is no particular limitation to the thickness of the colorant layer 3, the colorant layer 3 is preferably in the range of not less than 0.1 µm and not more than 3 µm in thickness.

According to the thermal transfer sheet used in the combination of one embodiment, a high-density image can be formed without applying a large amount of energy, and releasability when separating the colorant layer 3 from the receiving layer 53 can be satisfied. But in order to further improve releasability, various release agents may be contained in the colorant layer 3.

Examples of release agents include conventionally known release agents such as solid waxes such as polyethylene wax, amide wax, and Teflon (registered tradename) powder, fluorine and phosphate ester surfactants, silicone resins, and silicone oils. These can be used singly, or two or more thereof can be used as a mixture. A modified silicone oil is preferably used in the present invention. Examples of the modified silicone oil include side-chain type modified silicone oils, dual-end type modified silicone oils, single-end type modified silicone oils, side-chain dual-end type modified silicone oils, silicone-grafted acrylic resins, and methylphenyl silicone oils.

Modified silicone oils are divided into reactive silicone oils and non-reactive silicone oils. Examples of reactive silicone oils include amino modified, epoxy modified, carboxyl modified, carbinol modified, methacryl modified, mercapto modified, phenol modified, single-end reactive, and heterogeneous functional group modified silicone oils. Examples of non-reactive silicone oils include polyether modified, methylstyryl modified, alkyl modified, higher fatty acid ester modified, hydrophilic specially modified, higher alkoxy modified, higher fatty acid modified, and fluorine modified silicone oils.

There is no particular limitation to the content of the release agent, and the content can be suitably adjusted in relation to the receiving layer 53 of the intermediate transfer medium 60, which will be described below. For example, when measures to improve releasability are taken on the side of the receiving layer 53 of the intermediate transfer medium 60, it is possible to further improve releasability between the receiving layer 53 of the intermediate transfer medium 60 and the colorant layer 3 of the thermal transfer sheet without a release agent contained in the colorant layer 3.

When no releasability measures are taken on the side of the receiving layer 53 of the intermediate transfer medium 60, or in other words, when the receiving layer 53 does not contain a release agent or when the content thereof is very small, preferably the colorant layer 3 contains a release agent, and more preferably the release agent is contained in an amount of not less than 0.3% by mass and not more than 30% by mass on the basis of the total mass of the colorant layer 3. According to the colorant layer 3 of a preferred embodiment, it is possible to further improve releasability from the receiving layer 53 of the intermediate transfer medium 60.

Further, it is preferable that one or both of the colorant layer 3 and the receiving layer 53 contain a release agent such that the total of the content (% by mass) of the release agent on the basis of the total mass of the colorant layer 3 and the content (% by mass) of the release agent on the basis of the total mass of the receiving layer 53 is in the range of not less than 0.3% by mass and not more than 30% by mass. In this case, the receiving layer 53 contains a release agent more preferably in an amount of not less than 0.5% by mass and not more than 20% by mass, more preferably in an amount of not less than 0.5% by mass and not more than 15% by mass, and particularly preferably in an amount of not less than 0.5% by mass and not more than 10% by mass.

(Back Face Layer)

In the embodiments shown in FIGS. 1 and 2, the back face layer 5 is provided on the other surface of the substrate 1 (on the lower-surface side of the substrate layer 1 in the embodiments shown in FIGS. 1 and 2). The back face layer 5 is an optional constituent of the thermal transfer sheet 10 used in the combination of one embodiment.

As the resins contained in the back face layer 5, for example, natural or synthetic resins, for example, cellulosic resins, such as ethyl cellulose, hydroxy cellulose, hydroxypropyl cellulose, methyl cellulose, cellulose acetate, cellulose acetate butyrate, and nitro cellulose; vinyl type resins, such as polyvinyl alcohol, polyvinyl acetate, polyvinyl butyral, polyvinyl acetal, and polyvinyl pyrrolidone; acrylic resins, such as polymethyl methacrylate, polyethyl acrylate, polyacrylamide, and acrylonitrile-styrene copolymer; polyamide resin; polyvinyltoluene resin; coumarone-indene resins; polyester resins; polyurethane resins; and silicone-modified or fluorine-modified urethanes are exemplified. These resins may be used either solely on an individual basis, or may be used as a mixture of two or more of them in combination. In order to further enhance the heat resistance of the back face layer, a resin containing a reactive group based on a hydroxyl group among the above resins can be used in combination with polyisocyanate or the like as a crosslinking agent to form a cross-linked resin.

In order to improve slidability over a heating member such as a thermal head, a release agent or a lubricant can be contained in the back face layer 5. As the release agent or the lubricant for example, various waxes, such as polyethylene wax and paraffin wax, higher aliphatic alcohols, organo polysiloxanes, anionic surfactants, cationic surfactants, amphoteric surfactants, nonionic surfactants, fluorine type surfactants, organic carboxylic acids and derivatives thereof, fluorine type resins, silicone type resins, and fine particles of inorganic compounds such as talc, and silica, may be used. The content of the lubricant in the back face layer is in the range of not less than 5% by mass and not more than 50% by mass, preferably not less than 10% by mass and not more than 30% by mass.

There is no particular limitation to the method for forming the back face layer 5, and the back face layer 5 can be formed by preparing a coating liquid for back face layer wherein a resin and as necessary a release agent, a lubricant, or the like are dissolved or dispersed in a suitable solvent, coating the other surface of the substrate 1 with this coating liquid, and then drying the coating liquid. Although there is also no particular limitation to the thickness of the back face layer 5, the back face layer 5 is in the range of not less than 0.1 μm and not more than 10 μm in thickness.

<Intermediate Transfer Medium>

Figure 3:
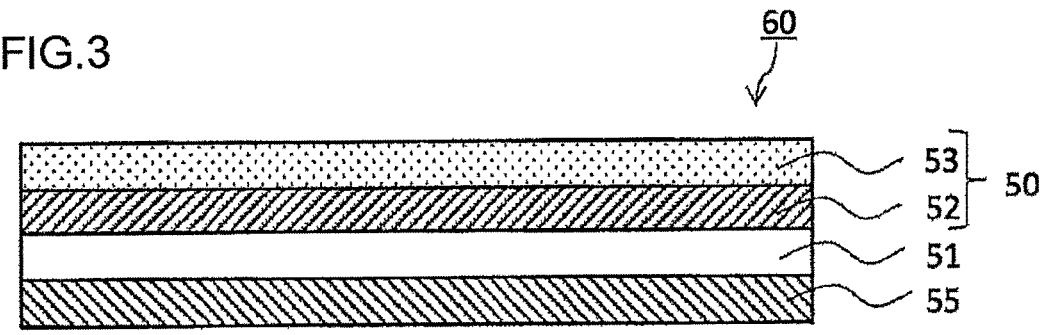
FIG. 3 is a schematic sectional view showing an embodiment of the intermediate transfer medium used in the combination of the invention.

Next, the intermediate transfer medium 60 used in the combination of one embodiment will now be described. As shown in FIG. 3, the intermediate transfer medium 60 used in the combination of one embodiment (hereinafter sometimes simply referred to as an intermediate transfer medium) has a structure wherein the protective layer 52 and the receiving layer 53 are layered in this order on one surface of another substrate 51. In the depicted embodiment, a back face layer 55 is provided on the other surface of the another substrate 51. The another substrate 51, the protective layer 52, and the receiving layer 53 are essential constituents of the intermediate transfer medium 60 used in the combination of one embodiment, and the back face layer 55 is an optional constituent. FIG. 3 is a schematic sectional view of the intermediate transfer medium 60 used in the combination of one embodiment. Next, the respective constituents of the intermediate transfer medium 60 used in the combination of one embodiment will now be described.

(Another Substrate)

The another substrate 51 is an essential constituent of the intermediate transfer medium 60 used in the combination of one embodiment and supports the protective layer 52 provided on one surface of the another substrate 51 and the back face layer 55 optionally provided on the other surface of the another substrate 51. Although there is no particular limitation to the material of the another substrate 51, desirably the another substrate 51 withstands heat applied when transferring the protective layer 52 provided on the another substrate 51 onto a transfer receiving article together with the receiving layer 53 and has mechanical properties that do not result in handling problems. Examples of such another substrate 51 include unstretched or stretched plastic films, for example, polyesters having high heat resistance such as polyethylene terephthalate and polyethylene naphthalate; polypropylene; polycarbonate; cellulose acetate; polyethylene derivatives; polyamides, and polymethylpentene, etc. Composite films obtained by laminating two or more of these materials can be also used. Although the thickness of the another substrate 51 can be suitably selected according to the material so that the strength, heat resistance and the like of the another substrate are appropriate, the another substrate 51 is preferably not less than 1 μm and not more than 100 μm in thickness.

(Transfer Layer)

The protective layer 52 and the receiving layer 53 provided on the another substrate 51 are layers that are to be separated from the another substrate 51 and transferred onto a transfer receiving article during thermal transfer. Accordingly, herein, a laminate of the protective layer 52 and the receiving layer 53 is referred to as a transfer layer 50.

(Protective Layer)

The protective layer 52 is provided on the another substrate 51. The protective layer 52 is an essential constituent of the intermediate transfer medium 60 used in the combination of one embodiment and is a layer that imparts durability to a print formed by the combination of one embodiment.

There is no particular limitation to the resin component constituting the protective layer 52, and examples include polyester resins, polycarbonate resins, acrylic resins, ultraviolet absorbing resins, epoxy resins, polystyrene resins, polyurethane resins, acrylic urethane resins, and silicone-modified forms of these resins, any blends of these resins, ionizing radiation curable resins, and ultraviolet absorbing resins.

In particular, the protective layer 52 containing an ionizing radiation curable resin can be suitably used as a resin component of the protective layer 52 in terms of having particularly superior plasticizer resistance and scratch resistance. There is no particular limitation to the ionizing radiation curable resin, and thus it can be suitably selected from among the ionizing radiation curable resins known in the art. For example, it is possible to use those obtained by cross-linking and curing a radically polymerizable polymer or oligomer by irradiation with ionizing radiation, and optionally adding a photo-polymerization thereto followed by polymerizing and cross-linking by electron beam or ultraviolet light. According to the protective layer 52 containing an ultraviolet absorbing resin, it is possible to impart great light resistance to a print formed by using the intermediate transfer medium 60 having the protective layer 52.

As an ultraviolet ray absorbing resin, for example, a resin which is prepared by reacting and linking a reactive ultraviolet ray absorbing agent to a thermoplastic resin or the ionizing radiation curable resin mentioned above can be used. Specific examples include those which are prepared by introducing a reactive group such as an addition-polymerizable double bond (for example, vinyl group, acryloyl group, methacryloyl group, etc.), alcoholic hydroxyl group, amino group, carboxyl group, epoxy group, isocyanate group, etc., into a non-reactive organic ultraviolet ray absorbing agent known in the art such as a salicylate, benzophenon, benzotriazole, substituted acrylonitrile, nikkel-chelate, or hindered amine ultraviolet ray absorbing agent.

Further, any additives may be added if necessary, such as lubricants, plasticizers, fillers, antistatic agents, anti-blocking agents, cross-linking agents, antioxidants, UV absorbers, light stabilizers, and colorants such as dyes and pigments. There is no particular limitation to the method for forming the protective layer 52, and the protective layer 52 can be formed by preparing a coating liquid for protective layer wherein one or more example resin materials above are dissolved or dispersed in a suitable solvent, coating the another substrate 51 (or a release layer (not shown) optionally provided on the another substrate 51 as necessary) with this coating liquid, and then drying the coating liquid.

Although there is no particular limitation to the thickness of the protective layer 52, the protective layer 52 is usually in the range of not less than 0.1 μm and not more than 50 μm and preferably not less than 1 μm and not more than 20 μm in thickness.

(Receiving Layer)

As shown in FIG. 3, the receiving layer 53 is provided on the protective layer 52. The colorant of the colorant layer 3 constituting the thermal transfer sheet 10 used in the combination of one embodiment is transferred onto the receiving layer 53 by thermal transfer, and thus a thermal transfer image is formed. After a thermal transfer image is formed on the receiving layer 53, the transfer layer 50 of the intermediate transfer medium 60 is transferred onto a transfer receiving article, and as a result, a print 200 is obtained in which the transfer layer 50 is provided on the transfer receiving article.

In the combination of one embodiment, the thermal transfer sheet 10 used in the combination includes the primer layer 2 containing the "group of components", and it is therefore possible to form a high-density thermal transfer image on the receiving layer 53 while suppressing damage to the receiving layer 53 during the formation of the thermal transfer image.

Although there is no particular limitation to the components contained in the receiving layer 53, preferably the receiving layer 53 contains a component that facilitates accepting the colorant contained in the colorant layer 3 constituting the thermal transfer sheet 10 used in the combination of one embodiment. Examples of such components include polyolefin resins such as polypropylene; halogenated resins such as polyvinyl chloride and polyvinylidene chloride; vinyl resins such as polyvinyl acetate, vinyl chloride-vinyl acetate copolymer, ethylene-vinyl acetate copolymer and polyacrylic ester; polyester resins such as polyethylene terephthalate and polybutylene terephthalate; polystyrene resins; polyamide resins; copolymer resins of an olefin such as ethylene or propylene and another vinyl polymer; ionomer or cellulose-based resins such as cellulose diastase; and polycarbonate. In particular, vinyl chloride resin, acryl-styrene resin or a polyester resin is preferred.

Although there is no limitation to the content of the resin component contained in the receiving layer 53, preferably the content of the resin component is not less than 50% by mass on the basis of the total mass of the receiving layer 53.

The receiving layer 53 of a preferred embodiment contains as the resin component a resin component having a number average molecular weight (Mn) of not less than 6000 and not more than 35000, particularly not less than 6000 and not more than 30000. According to the receiving layer 53 of a preferred embodiment, it is possible to further improve the durability of the print 200 formed by the combination of one embodiment. Further, by using a resin component having a number average molecular weight (Mn) of not more than 35000, particularly not more than 30000, transferability can be further improved, and tailing or the like during transferring can be sufficiently suppressed. The number average molecular weight (Mn) as referred to herein means a molecular weight measured in accordance with JIS-K-7252-1 (2008) by GPC (gel permeation chromatography) in terms of polystyrene.

The receiving layer 53 of a preferred embodiment contains as the resin component a resin component having a glass transition temperature (Tg) of not less than 60° C. and not more than 100° C. According to the receiving layer 53 of a preferred embodiment, the durability of the print 200 formed by the combination of one embodiment can be further improved. Further, by using a resin component having a glass transition temperature (Tg) of not less than 60° C., blocking resistance can be improved. Furthermore, by using a resin component having a glass transition temperature (Tg) of not more than 100° C., transferability can be further improved, and tailing or the like during transferring can be sufficiently suppressed. The glass transition temperature (Tg) as referred to herein means a temperature calculated from measurement of a change of calorie (DSC method) by DSC (differential scanning calorimetry) in accordance with JIS-K-7121 (2012).

The receiving layer 53 of a particularly preferred embodiment contains as the resin component a resin component having a number average molecular weight (Mn) of not less than 6000 and not more than 35000 and a glass transition temperature (Tg) of not less than 60° C. and not more than 100° C.

Various release agents may be contained in the receiving layer 53. According to the receiving layer 53 containing a release agent, it is possible to suppress thermal fusion of the colorant layer 3 and the receiving layer 53 when forming a thermal transfer image on the receiving layer 53 in combination with the thermal transfer sheet 10 used in the combination of one embodiment, and also suppress abnormal transfer, in which the receiving layer that should otherwise remain on the side of the substrate of the intermediate transfer medium is transferred to the thermal transfer sheet side when separating the colorant layer 3 from the receiving layer 53 after the thermal transfer image is formed. That is, the releasability between the receiving layer 53 of the intermediate transfer medium and the colorant layer 3 of the thermal transfer sheet can be improved.

As the release agent, release agents described in relation to the colorant layer 3 of the thermal transfer sheet can be suitably selected and used. Therefore, a detailed description of the release agent is omitted here.

As described above, when measures to improve releasability are taken on the side of the colorant layer 3 of the thermal transfer sheet, it is possible to further improve the release agent without the release agent contained in the receiving layer 53. But when the colorant layer 3 of the thermal transfer sheet does not contain a release agent or when the content thereof is very small, preferably the receiving layer 53 contains a release agent, and more preferably the release agent is contained in an amount of not less than 0.5% by mass and not more than 20% by mass on the basis of the total mass of the receiving layer 53, further preferably contained in an amount of not less than 0.5% by mass and not more than 15% by mass, and particularly preferably contained in an amount of not less than 2.5% by mass and not more than 10% by mass. According to the receiving layer 53 of a preferred embodiment, while further improving releasability concerning the colorant layer 3 of the thermal transfer sheet 10, transferability when transferring the transfer layer 50 including the receiving layer 53, on which a thermal transfer image has been formed, onto a transfer receiving article, or in other words, adhesion between the transfer layer 50 and the transfer receiving article can be sufficiently satisfied. While the release agent has a role of improving releasability concerning the colorant layer 3 of the thermal transfer sheet 10, the release agent has properties deleterious to adhesion between the transfer receiving article 100 and the transfer layer 50 when transferring the transfer layer 50 onto the transfer receiving article.

The receiving layer 53 of a particularly preferred embodiment contains a release agent and a resin component having a number average molecular weight (Mn) of not less than 6000 and not more than 35000, the content of the release agent being as described in relation to the receiving layer of a preferred embodiment above. When the content of the release agent on the basis of the total mass of the receiving layer 53 is less than 2.5% by mass, preferably the receiving layer 53 contains a resin component having a number average molecular weight (Mn) of not less than 13000, and more preferably contains a resin component having a number average molecular weight (Mn) of not less than 25000.

There is no particular limitation to the method for forming the receiving layer 53, and the receiving layer 53 can be formed by, for example, preparing a coating liquid for receiving layer wherein a resin component and optionally added various components such as a release agent are dissolved or dispersed in a suitable solvent, coating the protective layer 52 (or when a layer is optionally provided on the protective layer 52, this optionally provided layer) with this coating liquid, and then drying the coating liquid. Although there is also no particular limitation to the thickness of the receiving layer 53, the receiving layer 53 is preferably in the range of not less than 1 μm and not more than 10 μm in thickness.

In order to improve the releasability of the transfer layer 50 from the another substrate 51, a release layer (not shown) can also be provided between the another substrate 51 and the protective layer 52. Examples of components constituting the release layer include waxes, silicone waxes, silicone resins, modified silicone resins, fluorine resins, modified fluorine resins, polyvinyl alcohol, acrylic resins, thermally cross-linkable epoxy-amino resins, and thermally cross-linkable alkyd-amino resins. The release layer may be composed of one component, or may be composed of two or more components. The release layer can be formed by using a cross-linking agent such as isocyanate, a catalyst such as tin catalyst, aluminum catalyst, in addition to the releasing resins. The release layer is a layer constituting the transfer layer 50, and is a layer transferred to the transfer receiving article 100 side together with the protective layer 52 and the receiving layer 53 during thermal transfer.

There is no particular limitation to the thickness of the release layer, and the release layer is usually in the range of not less than 0.5 and not more than 5 μm in thickness. There is no particular limitation to the method for forming the release layer, and the release layer can be formed by preparing a coating liquid for release layer wherein the above-mentioned components are dissolved or dispersed in a suitable solvent, coating the another substrate 51 with this coating liquid, and then drying the coating liquid.

(Plasticizer Resistive Layer)

In order to improve the plasticizer resistance of the print formed by using the combination of one embodiment, a plasticizer resistive layer (not shown) may be provided as a layer constituting the transfer layer 50 in a suitable place such as between the protective layer and the receiving layer or between the release layer and the protective layer. The plasticizer resistance layer is an optional layer which constitutes the transfer layer 50. As a component of the plasticizer resistive layer, a component which repels the plasticizer component, or a substance which gives the plasticizer component difficulties in reaching the printed image, can be preferably used. Examples of the component which repels the plasticizer component include polyvinyl alcohol resins, polyvinyl butyral resins, polyvinyl acetal resins, and polyvinyl pyrrolidone resins. Examples of the substance which gives the plasticizer component difficulties in reaching the printed image include cationic resins such as cationic urethane emulsion. These substances may be used singly, or two or more thereof may be used as a mixture.

The polyvinyl alcohol resins, polyvinyl butyral resins, and polyvinyl acetal resins exemplified as substances which repel the plasticizer component preferably have a saponification degree of not less than 30%, and more preferably not less than 60%. When a polyvinyl alcohol resin, a polyvinyl butyral resin, or a polyvinyl acetal resin having a saponification degree in this range is contained in the plasticizer resistive layer, it is possible to further improve the plasticizer resistance of the print to be formed. The "saponification degree" as used herein refers to a value obtained by dividing the number of moles of vinyl alcohol structures in the polymer by the number of moles of all monomers in the polymer. It is preferable that the substance which repels the plasticizer component, or the substance which gives the plasticizer component difficulties in reaching the printed image, be contained in the plasticizer resistive layer so that the amount of the substance is in the range of not less than 20% by mass and not more than 100% by mass on the basis of the total mass of the plasticizer resistive layer.

Further, if necessary, it is possible to add to the plasticizer resistive layer, any additives, for example, lubricants, plasticizers, fillers, antistatic agents, anti-blocking agents, cross-linking agents, antioxidants, UV absorbers, light stabilizers, colorants such as dyes and pigments, fluorescent whitening agents, etc. The optionally provided plasticizer resistive layer can be formed by preparing a coating liquid for plasticizer resistive layer in which one or more members of the substances exemplified above and optionally added various materials are dissolved or dispersed in a suitable solvent, coating the protective layer 52 or the optionally provided release layer with this coating liquid, and then drying the coating liquid. Although there is no particular limitation to the thickness of the plasticizer resistive layer, the plasticizer resistive layer is in the range of not less than 0.1 μm and not more than 50 μm and preferably in the range of not less than 1 μm and not more than 20 μm in thickness.

(Back Face Layer)

The back face layer 55 may be provided on the other surface of the another substrate 51. The back face layer 55 is an optional constituent of the intermediate transfer medium 60 used in the combination of one embodiment. As the back face layer 55, a layer described as the back face layer 5 in relation to the thermal transfer sheet 10 used in the combination of one embodiment can be used as it is. Therefore, a detailed description of the back face layer 55 is omitted here.

«Print Forming Method»

Figure 4A:
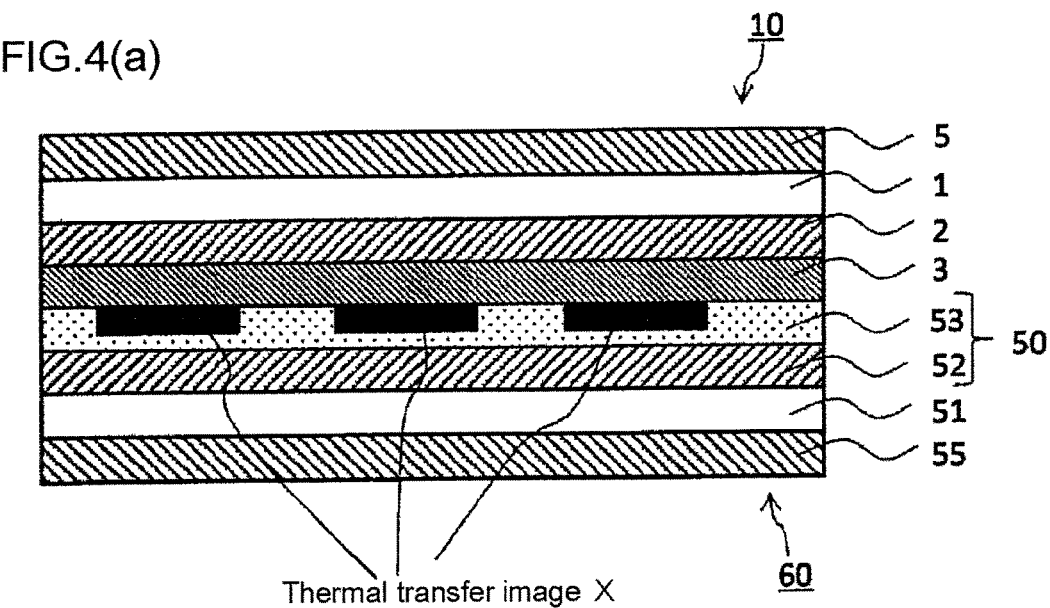
FIG. 4 is a schematic sectional view for explaining the print forming method of the present invention.
Figure 4B:
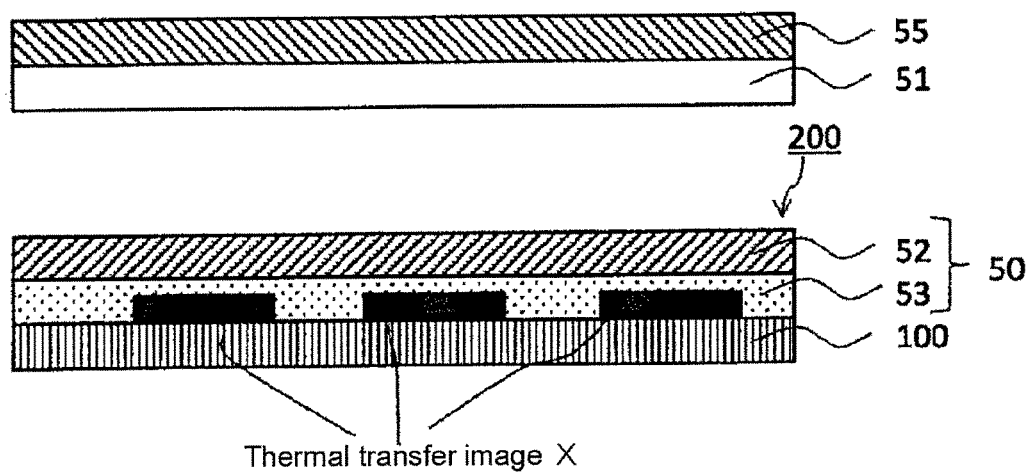

Next, the print forming method of one embodiment of the present invention (hereinafter referred to as a print forming method of one embodiment) will now be described. The print forming method of one embodiment includes a providing step of providing: the thermal transfer sheet 10 including the substrate 1, the primer layer 2, and the colorant layer 3, wherein the primer layer 2 and the colorant layer 3 are layered in this order on one surface of the substrate 1 as shown in FIGS. 1 and 2; the intermediate transfer medium 60 including the another substrate 51, the protective layer 52, and the receiving layer 53, wherein the protective layer 52 and the receiving layer 53 are layered in this order on one surface of the another substrate 51 as shown in FIG. 3; and the transfer receiving article 100; a thermal transfer image forming step of transferring a colorant contained in the colorant layer 3 of the thermal transfer sheet 10 onto the receiving layer 53 of the intermediate transfer medium 60 to form a thermal transfer image X on the receiving layer 53 as shown in FIG. 4(a); and a print forming step of transferring the receiving layer 53, on which the thermal transfer image has been formed, onto the transfer receiving article together with the protective layer 52 as shown in FIG. 4(b). The print forming method of one embodiment is characterized in that the primer layer 2 of the thermal transfer sheet 10 used to form the thermal transfer image X contains one or more selected from the group consisting of particles derived from colloidal inorganic particles, polyvinyl alcohol resins, polyvinyl pyrrolidone resins, and polyurethane resins.

According to the print forming method of one embodiment having these characteristics, it is possible to form a high-density thermal transfer image while suppressing damage to the receiving layer 53 during the formation of the thermal transfer image, and, further, by suppressing damage to the receiving layer 53, it is possible to improve transferability exerted when transferring the transfer layer 50 including the receiving layer 53, on which the thermal transfer image has been formed, onto the transfer receiving article 100 to form the print 200, or in other words, adhesion between the transfer layer 50 and the transfer receiving article 100. Hereinafter, the respective steps will now be described.

<Providing Step>

This step is a step of providing the thermal transfer sheet 10, the intermediate transfer medium 60, and the transfer receiving article 100. For the thermal transfer sheet 10 and the intermediate transfer medium 60 provided in this step, the thermal transfer sheet 10 (see FIGS. 1 and 2) and the intermediate transfer medium 60 (see FIG. 3) described in relation to the combination of one embodiment can be used as they are. Therefore, a detailed description thereof is omitted here.

(Transfer Receiving Article)

There is no particular limitation to the transfer receiving article 100, and examples include, but are not limited to, card substrates, natural fiber paper, coated paper, tracing paper, glasses, metals, ceramics, woods, and cloths used in the field of ID cards and IC cards. Examples of card substrates include resin sheet molded from a polyvinyl chloride resin, a vinyl chloride-vinyl acetate copolymer, a polyester resin or the like, and metal sheet. The thickness of the card substrate may be suitably determined according to the intended use of a print eventually formed. In particular, according to the print forming method of the present invention, the transferability of the transfer layer can be improved even when a card substrate that is considered difficult to satisfy the transferability of the transfer layer of the intermediate transfer medium is used as a transfer receiving article.

<Thermal Transfer Image Forming Step>

This step, as shown in FIG. 4(a), is a step of transferring the colorant contained in the colorant layer 3 of the thermal transfer sheet 10 onto the receiving layer 53 of the intermediate transfer medium 60 to form the thermal transfer image X on the receiving layer 53. The thermal transfer image can be formed on the receiving layer 53 by arranging the colorant layer 3 of the thermal transfer sheet 10 and the receiving layer 53 of the intermediate transfer medium 60 to face each other and applying energy according to thermal transfer image information by a heating member such as a thermal head from the back face side of the thermal transfer sheet 10.

<Print Forming Step>

This step, as shown in FIG. 4(b) is a step of transferring the receiving layer 53, on which the thermal transfer image has been formed, onto the transfer receiving article 100 together with the protective layer 52. Through this step, the print 200 is obtained wherein the transfer layer 50 including the receiving layer 53, on which the thermal transfer image has been formed, is provided on the transfer receiving article 100. Transfer of the transfer layer 50 including the receiving layer 53, on which the thermal transfer image has been formed, onto the transfer receiving article 100 can be performed by superposing the transfer receiving article 100 and the intermediate transfer medium 60 having the receiving layer 53 on which the thermal transfer image has been formed, and applying energy from the back face side of the intermediate transfer medium 60 by a conventionally known heating device such as a thermal head, a hot plate, a hot stamper, a heating roll, a line heater, or an iron.

EXAMPLES

Next, the present invention will now be more specifically described by way of Examples. Below, the term "part(s)" means part(s) by mass unless specified otherwise.

(Preparation of Intermediate Transfer Medium (1))

A polyethylene terephthalate film (Lumirror (registered tradename), Toray Industries, Inc.) having a thickness of 12 μm as a substrate was coated with a coating liquid for release layer having the following composition so as to obtain a thickness after drying of 1 μm, then the coating liquid was dried, and thus a release layer was formed. Then, the release layer was coated with a coating liquid for protective layer having the following composition so as to obtain a thickness after drying of 2 μm, then the coating liquid was dried, and thus a protective layer was formed. Further, the protective layer was coated with a coating liquid for receiving layer 1 having the following composition so as to obtain a thickness after drying of 2 μm, then the coating liquid was dried, and thus a receiving layer was formed. Thus, an intermediate transfer medium 1 was obtained wherein a transfer layer including a release layer, a protective layer, and a receiving layer layered in this order was provided on a substrate. The coating liquid for release layer, the coating liquid for protective layer, and the coating liquid for receiving layer were all applied using a gravure coater.

<Coating Liquid for Release Layer>

| | |
|---|---|
| Acrylic resin (BR-87, Mitsubishi Rayon Co., Ltd.) | 95 parts |
| Polyester resin (Vylon (registered tradename) 200, TOYOBO Co., Ltd.) | 5 parts |
| Toluene | 200 parts |
| Methyl ethyl ketone | 200 parts |

<Coating Liquid for Protective Layer>

| | |
|---|---|
| Polyester resin (Vylon (registered tradename) 200, TOYOBO Co., Ltd.) | 20 parts |
| Toluene | 40 parts |
| Methyl ethyl ketone | 40 parts |

<Coating Liquid for Receiving Layer 1>

| | |
|---|---|
| Vinyl chloride - vinyl acetate copolymer (Mn: 12000, Tg: 76° C.) (SOLBIN (registered tradename) CNL, Nissin Chemical Industry Co., Ltd.) | 19 parts |

|  |  |
|---|---|
| Silicone oil | 4 parts |
| Methyl ethyl ketone | 20 parts |
| Toluene | 20 parts |

(Preparation of Intermediate Transfer Medium (2))

The same procedure as the intermediate transfer medium (1) was performed, except for using a coating liquid for receiving layer 2 having the following composition in place of the coating liquid for receiving layer 1 and, thereby, an intermediate transfer medium (2) was prepared wherein a transfer layer including a release layer, a protective layer, and a receiving layer layered in this order was provided on a substrate.

<Coating Liquid for Receiving Layer 2>

|  |  |
|---|---|
| Vinyl chloride - vinyl acetate copolymer (Mn: 12000, Tg: 76° C.) (SOLBIN (registered tradename) CNL, Nissin Chemical Industry Co., Ltd.) | 19 parts |
| Silicone oil (X22-3000T, Shin-Etsu Chemical Co., Ltd.) | 1 part |
| Methyl ethyl ketone | 40 parts |
| Toluene | 40 parts |

(Preparation of Intermediate Transfer Medium (3))

The same procedure as the intermediate transfer medium (1) was performed, except for using a coating liquid for receiving layer 3 having the following composition in place of the coating liquid for receiving layer 1 and, thereby, an intermediate transfer medium (3) was prepared wherein a transfer layer including a release layer, a protective layer, and a receiving layer layered in this order was provided on a substrate.

<Coating Liquid for Receiving Layer 3>

|  |  |
|---|---|
| Vinyl chloride - vinyl acetate copolymer (Mn: 12000, Tg: 76° C.) (SOLBIN (registered tradename) CNL, Nissin Chemical Industry Co., Ltd.) | 19.6 parts |
| Silicone oil (X22-3000T, Shin-Etsu Chemical Co., Ltd.) | 0.4 parts |
| Methyl ethyl ketone | 40 parts |
| Toluene | 40 parts |

(Preparation of Intermediate Transfer Medium (4))

The same procedure as the intermediate transfer medium (1) was performed, except for using a coating liquid for receiving layer 4 having the following composition in place of the coating liquid for receiving layer 1 and, thereby, an intermediate transfer medium (4) was prepared wherein a transfer layer including a release layer, a protective layer, and a receiving layer layered in this order was provided on a substrate.

<Coating Liquid for Receiving Layer 4>

|  |  |
|---|---|
| Vinyl chloride - vinyl acetate copolymer (Mn: 12000, Tg: 76° C.) (SOLBIN (registered tradename) CNL, Nissin Chemical Industry Co., Ltd.) | 16 parts |
| Silicone oil (X22-3000T, Shin-Etsu Chemical Co., Ltd.) | 4 parts |
| Methyl ethyl ketone | 40 parts |
| Toluene | 40 parts |

(Preparation of Intermediate Transfer Medium (5))

The same procedure as the intermediate transfer medium (1) was performed, except for using a coating liquid for receiving layer 5 having the following composition in place of the coating liquid for receiving layer 1 and, thereby, an intermediate transfer medium (5) was prepared wherein a transfer layer including a release layer, a protective layer, and a receiving layer layered in this order was provided on a substrate.

<Coating Liquid for Receiving Layer 5>

|  |  |
|---|---|
| Vinyl chloride - vinyl acetate copolymer (Mn: 31000, Tg: 70° C.) (SOLBIN (registered tradename) C, Nissin Chemical Industry Co., Ltd.) | 19 parts |
| Silicone oil (X22-3000T, Shin-Etsu Chemical Co., Ltd.) | 1 part |
| Methyl ethyl ketone | 40 parts |
| Toluene | 40 parts |

(Preparation of Intermediate Transfer Medium (6))

The same procedure as the intermediate transfer medium (1) was performed, except for using a coating liquid for receiving layer 6 having the following composition in place of the coating liquid for receiving layer 1 and, thereby, an intermediate transfer medium (6) was prepared wherein a transfer layer including a release layer, a protective layer, and a receiving layer layered in this order was provided on a substrate.

<Coating Liquid for Receiving Layer 6>

|  |  |
|---|---|
| Vinyl chloride - vinyl acetate copolymer (Mn: 31000, Tg: 70° C.) (SOLBIN (registered tradename) C, Nissin Chemical Industry Co., Ltd.) | 19.6 parts |
| Silicone oil (X22-3000T, Shin-Etsu Chemical Co., Ltd.) | 0.4 parts |
| Methyl ethyl ketone | 40 parts |
| Toluene | 40 parts |

(Preparation of Intermediate Transfer Medium (7))

The same procedure as the intermediate transfer medium (1) was performed, except for using a coating liquid for receiving layer 7 having the following composition in place of the coating liquid for receiving layer 1 and, thereby, an intermediate transfer medium (7) was prepared wherein a transfer layer including a release layer, a protective layer, and a receiving layer layered in this order was provided on a substrate.

<Coating Liquid for Receiving Layer 7>

|  |  |
|---|---|
| Vinyl chloride - vinyl acetate copolymer (Mn: 42000, Tg: 75° C.) (SOLBIN (registered tradename) CN, Nissin Chemical Industry Co., Ltd.) | 19.6 parts |
| Silicone oil (X22-3000T, Shin-Etsu Chemical Co., Ltd.) | 0.4 parts |
| Methyl ethyl ketone | 40 parts |
| Toluene | 40 parts |

(Preparation of Intermediate Transfer Medium (8))

The same procedure as the intermediate transfer medium (1) was performed, except for using a coating liquid for receiving layer 8 having the following composition in place of the coating liquid for receiving layer 1 and, thereby, an intermediate transfer medium (8) was prepared wherein a transfer layer including a release layer, a protective layer, and a receiving layer layered in this order was provided on a substrate.

<Coating Liquid for Receiving Layer 8>

| | |
|---|---|
| Vinyl chloride - vinyl acetate copolymer (Mn: 12000, Tg: 76° C.) (SOLBIN (registered tradename) CNL, Nissin Chemical Industry Co., Ltd.) | 20 parts |
| Methyl ethyl ketone | 40 parts |
| Toluene | 40 parts |

(Preparation of Intermediate Transfer Medium (9))

The same procedure as the intermediate transfer medium (1) was performed, except for using a coating liquid for receiving layer 9 having the following composition in place of the coating liquid for receiving layer 1 and, thereby, an intermediate transfer medium (9) was prepared wherein a transfer layer including a release layer, a protective layer, and a receiving layer layered in this order was provided on a substrate.

<Coating Liquid for Receiving Layer 9>

| | |
|---|---|
| Vinyl chloride - vinyl acetate copolymer (Mn: 31000, Tg: 70° C.) (SOLBIN (registered tradename) C, Nissin Chemical Industry Co., Ltd.) | 19 parts |
| Methyl ethyl ketone | 40 parts |
| Toluene | 40 parts |

(Preparation of Thermal Transfer Sheet (1))

Using a polyethylene terephthalate film having a thickness of 4.5 μm, which had undergone easy-adhesive treatment in advance, as a substrate, one surface of the substrate was coated with a coating liquid for back face layer having the following composition so as to obtain a thickness after drying of 0.8 μm, then the coating liquid was dried, and thus a back face layer was formed. Then, the other surface of the substrate was coated with a coating liquid for primer layer 1 having the following composition so as to obtain a thickness after drying of 0.2 μm, then the coating liquid was dried, and thus a primer layer was formed. This primer layer was coated with a coating liquid for yellow colorant layer 1 having the following composition, a coating liquid for magenta colorant layer 1 having the following composition, and a coating liquid for cyan colorant layer 1 having the following composition so as to be layered in parallel across the surface of the primer layer and so as to obtain a thickness after drying of 0.6 μm each, and then the coating liquids were dried. Eventually, a thermal transfer sheet (1) was obtained.

<Coating Liquid for Back Face Layer>

| | |
|---|---|
| Polyvinyl butyral resin (S-LEC (registered tradename) BX-1, Sekisui Chemical Co., Ltd.) | 2 parts |
| Polyisocyanate (BURNOCK (registered tradename) D750, DIC Corporation) | 9.2 parts |
| Phosphoric ester surfactant (PLY SURF (registered tradename) A208N, Dai-ichi Kogyo Seiyaku, Co., Ltd.) | 1.3 parts |
| Talc (MICRO ACE (registered tradename) P-3, manufactured by Nippon Talc Co., Ltd.) | 0.3 parts |
| Toluene | 43.6 parts |
| Methyl ethyl ketone | 43.6 parts |

<Coating Liquid for Primer Layer 1>

| | |
|---|---|
| Alumina sol (solid content 10.5%) (Alumina Sol AL-200, Nissan Chemical Industries, Ltd.) | 50 parts (solid content 5.25 parts) |
| Water | 25 parts |
| Isopropyl alcohol | 25 parts |

<Coating Liquid for Yellow Colorant Layer 1>

| | |
|---|---|
| Yellow dye represented by the following formula (1) | 7 parts |
| Polyvinyl acetoacetal resin (S-LEC (registered tradename) KS-5, Sekisui Chemical Co., Ltd.) | 4 parts |
| Methyl ethyl ketone | 44.5 parts |
| Toluene | 44.5 parts |

[Formula 1]

<Coating Liquid for Magenta Colorant Layer 1>

| | |
|---|---|
| Magenta dye represented by the following formula (2) | 3 parts |
| Magenta dye (Disperse Violet 26) | 5 parts |
| Polyvinyl acetoacetal resin (S-LEC (registered tradename) KS-5, Sekisui Chemical Co., Ltd.) | 4 parts |
| Methyl ethyl ketone | 44 parts |
| Toluene | 44 parts |

[Formula 2]

<Coating Liquid for Cyan Colorant Layer 1>

| | |
|---|---|
| Cyan dye (Disperse Blue 354) | 2.5 parts |
| Cyan colorant represented by the following formula (3) | 5 parts |
| Polyvinyl acetoacetal resin (S-LEC (registered tradename) KS-5, Sekisui Chemical Co., Ltd.) | 4 parts |
| Methyl ethyl ketone | 44.25 parts |
| Toluene | 44.25 parts |

[Formula 3]

(Preparation of Thermal Transfer Sheet (2))

The same procedure as the thermal transfer sheet (1) was entirely performed, except for forming a primer layer by using a coating liquid for primer layer 2 having the following composition in place of the coating liquid for primer layer 1 and, thereby, a thermal transfer sheet (2) was prepared. <Coating Liquid for Primer Layer 2>

| | |
|---|---|
| Alumina sol (solid content 10.5%) (Alumina Sol AL-200, Nissan Chemical Industries, Ltd.) | 50 parts (solid content 5.25 parts) |
| Polyester resin (solid content 25%) (PLAS COAT Z-561, Goo Chemical Co., Ltd.) | 10.5 parts (solid content 2.7 parts) |
| Water | 32.25 parts |
| Isopropyl alcohol | 32.25 parts |

(Preparation of Thermal Transfer Sheet (3))

The same procedure as the thermal transfer sheet (1) was entirely performed, except for forming a primer layer by using a coating liquid for primer layer 3 having the following composition in place of the coating liquid for primer layer 1 and, thereby, a thermal transfer sheet (3) was prepared.

<Coating Liquid for Primer Layer 3>

| | |
|---|---|
| Colloidal silica (solid content 20.5%) (SNOWTEX, Nissan Chemical Industries, Ltd.) | 20.5 parts (solid content 4.2025 parts) |
| Polyester resin (solid content 25%) (PLAS COAT Z-561, Goo Chemical Co., Ltd.) | 4.2 parts (solid content 1.05 parts) |
| Water | 37.65 parts |
| Isopropyl alcohol | 37.65 parts |

(Preparation of Thermal Transfer Sheet (4))

The same procedure as the thermal transfer sheet (1) was entirely performed, except for forming a primer layer by using a coating liquid for primer layer 4 having the following composition in place of the coating liquid for primer layer 1 and, thereby, a thermal transfer sheet (4) was prepared.

<Coating Liquid for Primer Layer 4>

| | |
|---|---|
| Polyvinyl alcohol resin (GOHSENOL GH-17, The Nippon Synthetic Chemical Industry Co., Ltd.) | 4.2 parts |
| Polyester resin (solid content 25%) (PLAS COAT Z-561, Goo Chemical Co., Ltd.) | 4.2 parts (solid content 1.05 parts) |
| Water | 45.8 parts |
| Isopropyl alcohol | 45.8 parts |

(Preparation of Thermal Transfer Sheet (5))

The same procedure as the thermal transfer sheet (1) was entirely performed, except for forming a primer layer by using a coating liquid for primer layer 5 having the following composition in place of the coating liquid for primer layer 1 and, thereby, a thermal transfer sheet (5) was prepared.

<Coating Liquid for Primer Layer 5>

| | |
|---|---|
| Polyvinyl alcohol resin (GOHSENOL GH-17, The Nippon Synthetic Chemical Industry Co., Ltd.) | 4.2 parts |
| Water-dispersible isocyanate (WB40-100, Asahi Kasei Chemicals Corporation) | 1 part |
| Water | 47.4 parts |
| Isopropyl alcohol | 47.4 parts |

(Preparation of Thermal Transfer Sheet (6))

The same procedure as the thermal transfer sheet (1) was entirely performed, except for forming a primer layer by using a coating liquid for primer layer 6 having the following composition in place of the coating liquid for primer layer 1 and, thereby, a thermal transfer sheet (6) was prepared.

<Coating Liquid for Primer Layer 6>

| | |
|---|---|
| Polyvinyl pyrrolidone resin (PVP K-90, ISP Japan Ltd.) | 5.2 parts |
| Water | 47.4 parts |
| Isopropyl alcohol | 47.4 parts |

(Preparation of Thermal Transfer Sheet (7))

The same procedure as the thermal transfer sheet (1) was entirely performed, except for forming a primer layer by using a coating liquid for primer layer 7 having the following composition in place of the coating liquid for primer layer 1 and, thereby, a thermal transfer sheet (7) was prepared.

<Coating Liquid for Primer Layer 7>

| | |
|---|---|
| Urethane resin (solid content 25%) (Superflex (registered tradename) SF600, Dai-Ichi Kogyo Seiyaku Co., Ltd.) | 21 parts (solid content 5.25 parts) |
| Water | 39.5 parts |
| Isopropyl alcohol | 39.5 parts |

(Preparation of Thermal Transfer Sheet (8))

The same procedure as the thermal transfer sheet (1) was entirely performed, except for forming a coating liquid for yellow colorant layer 2, a coating liquid for magenta colorant layer 2, and a coating liquid for cyan colorant layer 2 having the following compositions in place of the coating liquid for yellow colorant layer 1, the coating liquid for magenta colorant layer 1, and the coating liquid for cyan colorant layer 1 and, thereby, a thermal transfer sheet (8) was prepared.

<Coating Liquid for Yellow Colorant Layer 2>

| | |
|---|---|
| Yellow dye represented by formula (1) above | 7 parts |
| Polyvinyl acetoacetal resin (S-LEC (registered tradename) KS-5, Sekisui Chemical Co., Ltd.) | 3.4 parts |
| Ethylcellulose resin (ETHOCEL STD 45, Nisshin & Co., Ltd.) | 0.6 parts |
| Methyl ethyl ketone | 44.5 parts |
| Toluene | 44.5 parts |

<Coating Liquid for Magenta Colorant Layer 2>

| | |
|---|---|
| Magenta dye represented by the formula (2) above | 3 parts |
| Magenta dye (Disperse Violet 26) | 5 parts |
| Polyvinyl acetoacetal resin (S-LEC (registered tradename) KS-5, Sekisui Chemical Co., Ltd.) | 3.4 parts |
| Ethylcellulose resin (ETHOCEL STD 45, Nisshin & Co., Ltd.) | 0.6 parts |
| Methyl ethyl ketone | 44 parts |
| Toluene | 44 parts |

<Coating Liquid for Cyan Colorant Layer 2>

| | |
|---|---|
| Cyan dye (Disperse Blue 354) | 2.5 parts |
| Cyan colorant represented by formula (3) above | 5 parts |
| Polyvinyl acetoacetal resin (S-LEC (registered tradename) KS-5, Sekisui Chemical Co., Ltd.) | 3.4 parts |
| Ethylcellulose resin (ETHOCEL STD 45, Nisshin & Co., Ltd.) | 0.6 parts |
| Methyl ethyl ketone | 44.25 parts |
| Toluene | 44.25 parts |

(Preparation of Thermal Transfer Sheet (9))

The same procedure as the thermal transfer sheet (1) was entirely performed, except for forming a coating liquid for yellow colorant layer 3, a coating liquid for magenta colorant layer 3, and a coating liquid for cyan colorant layer 3 having the following compositions in place of the coating liquid for yellow colorant layer 1, the coating liquid for magenta colorant layer 1, and the coating liquid for cyan colorant layer 1 and, thereby, a thermal transfer sheet (9) was prepared.

<Coating Liquid for Yellow Colorant Layer 3>

| | |
|---|---|
| Yellow dye represented by formula (1) above | 7 parts |
| Polyvinyl acetoacetal resin | 4 parts |
| (S-LEC (registered tradename) KS-5, Sekisui Chemical Co., Ltd.) | |
| Silicone oil | 0.06 parts |
| (X22-3939, Shin-Etsu Chemical Co., Ltd.) | |
| Methyl ethyl ketone | 44.5 parts |
| Toluene | 44.5 parts |

<Coating Liquid for Magenta Colorant Layer 3>

| | |
|---|---|
| Magenta dye represented by the formula (2) above | 3 parts |
| Magenta dye (Disperse Violet 26) | 5 parts |
| Polyvinyl acetoacetal resin | 4 parts |
| (S-LEC (registered tradename) KS-5, Sekisui Chemical Co., Ltd.) | |
| Silicone oil | 0.06 parts |
| (X22-3939, Shin-Etsu Chemical Co., Ltd.)) | |
| Methyl ethyl ketone | 44 parts |
| Toluene | 44 parts |

<Coating Liquid for Cyan Colorant Layer 3>

| | |
|---|---|
| Cyan dye (Disperse Blue 354) | 2.5 parts |
| Cyan dye represented by formula (3) above | 5 parts |
| Polyvinyl acetoacetal resin | 4 parts |
| (S-LEC (registered tradename) KS-5, Sekisui Chemical Co., Ltd.) | |
| Silicone oil | 0.06 parts |
| (X22-3939, Shin-Etsu Chemical Co., Ltd.)) | |
| Methyl ethyl ketone | 44.25 parts |
| Toluene | 44.25 parts |

(Preparation of Thermal Transfer Sheet (10))

The same procedure as the thermal transfer sheet (1) was entirely performed, except for forming a primer layer by using a coating liquid for primer layer 8 having the following composition in place of the coating liquid for primer layer 1 and, thereby, a thermal transfer sheet (10) was prepared.

<Coating Liquid for Primer Layer 8>

| | |
|---|---|
| Polyester resin (solid content 34%) (VYLONAL MF-1200, TOYOBO Co., Ltd.) | 15.4 parts (solid content 5.236 parts) |
| Water | 42.3 parts |
| Isopropyl alcohol | 42.3 parts |

(Preparation of Thermal Transfer Sheet (11))

The same procedure as the thermal transfer sheet (1) was entirely performed, except for forming a primer layer by using a coating liquid for primer layer 8 having the above composition in place of the coating liquid for primer layer 1 and forming the coating liquid for yellow colorant layer 2, the coating liquid for magenta colorant layer 2, and the coating liquid for cyan colorant layer 2 having the above compositions in place of the coating liquid for yellow colorant layer 1, the coating liquid for magenta colorant layer 1, and the coating liquid for cyan colorant layer 1 and, thereby, a thermal transfer sheet (11) was prepared.

(Preparation of Thermal Transfer Sheet (12))

The same procedure as the thermal transfer sheet (1) was entirely performed, except for forming a primer layer by using a coating liquid for primer layer 8 having the above composition in place of the coating liquid for primer layer 1 and forming the coating liquid for yellow colorant layer 3, the coating liquid for magenta colorant layer 3, and the coating liquid for cyan colorant layer 3 having the above compositions in place of the coating liquid for yellow colorant layer 1, the coating liquid for magenta colorant layer 1, and the coating liquid for cyan colorant layer 1 and, thereby, a thermal transfer sheet (12) was prepared.

(Combination of Thermal Transfer Sheet and Intermediate Transfer Medium)

The thermal transfer sheets and the intermediate transfer media prepared above were combined as shown in Table 1 below, and these combinations were regarded as Examples and Comparative Examples.

TABLE 1

| | Thermal transfer sheet | Intermediate transfer medium |
|---|---|---|
| Example 1 | Thermal transfer sheet (1) | Intermediate transfer medium (1) |
| Example 2 | Thermal transfer sheet (1) | Intermediate transfer medium (2) |
| Example 3 | Thermal transfer sheet (1) | Intermediate transfer medium (3) |
| Example 4 | Thermal transfer sheet (1) | Intermediate transfer medium (4) |
| Example 5 | Thermal transfer sheet (1) | Intermediate transfer medium (5) |
| Example 6 | Thermal transfer sheet (1) | Intermediate transfer medium (6) |
| Example 7 | Thermal transfer sheet (1) | Intermediate transfer medium (7) |
| Example 8 | Thermal transfer sheet (2) | Intermediate transfer medium (2) |
| Example 9 | Thermal transfer sheet (3) | Intermediate transfer medium (2) |
| Example 10 | Thermal transfer sheet (4) | Intermediate transfer medium (2) |
| Example 11 | Thermal transfer sheet (5) | Intermediate transfer medium (2) |
| Example 12 | Thermal transfer sheet (6) | Intermediate transfer medium (2) |
| Example 13 | Thermal transfer sheet (7) | Intermediate transfer medium (2) |
| Example 14 | Thermal transfer sheet (8) | Intermediate transfer medium (8) |
| Example 15 | Thermal transfer sheet (8) | Intermediate transfer medium (9) |
| Example 16 | Thermal transfer sheet (9) | Intermediate transfer medium (8) |
| Comparative Example 1 | Thermal transfer sheet (10) | Intermediate transfer medium (1) |
| Comparative Example 2 | Thermal transfer sheet (10) | Intermediate transfer medium (2) |
| Comparative Example 3 | Thermal transfer sheet (10) | Intermediate transfer medium (6) |
| Comparative Example 4 | Thermal transfer sheet (11) | Intermediate transfer medium (8) |
| Comparative Example 5 | Thermal transfer sheet (12) | Intermediate transfer medium (8) |

(Formation of Thermal Transfer Image on Receiving Layer)

Using the combinations of thermal transfer sheets and intermediate transfer media shown in Table 1 above, a black solid image (an image obtained by superposing a yellow image, a magenta image, and a cyan image) having a black solid density of around 1.8 was formed on the receiving layer of each intermediate transfer medium at a line cycle of 3 msec/line using the following test printer. Table 2 below shows the printing voltage attained when the black solid density reached around 1.8.

The lower the printing voltage when the black solid density reached around 1.8 is, the more damage to the receiving layer of the intermediate transfer medium can be suppressed during image formation.

(Test Printer)

Thermal head: KEE-57-12GAN2-STA (KYOCERA Corporation)

Average heating element resistance: 3303 (Ω)
Printing density in main scanning direction: 300 (dpi)
Printing density in sub scanning direction: 300 (dpi)
Line cycle: 3.0 (msec/line)
Printing starting temperature: 35 (° C.)
Pulse duty cycle: 85(%)

(Releasability Evaluation)

The releasability of the colorant layer (the cyan colorant layer) when a black solid image was formed on the receiving layer such that the black solid density was around 1.8 was evaluated according to the following evaluation criteria. The evaluation results are also shown in Table 2.

"Evaluation Criteria"

A: No traces of separating the colorant layer can be visually observed.

B: Slight traces of separating the colorant layer are created but can be barely observed visually.

NG: A large number of traces of separating the colorant layer can be visually observed.

(Formation of Print)

Using a polyvinyl chloride card (PVC card, Dai Nippon Printing Co., Ltd.) and a card laminator (SIP), the above-mentioned transfer layer including a receiving layer on which a thermal transfer image had been formed (a transfer layer wherein a release layer, a protective layer, and a receiving layer on which a thermal transfer image had been formed were layered in this order from the substrate side) was transferred onto the PVC card under conditions having 180° C. and 2 sec/inch to form the prints of Examples and Comparative Examples wherein the transfer layer was transferred onto the PVC card.

(Evaluation of Transferability of Transfer Layer)

In forming the prints of the Examples and Comparative Examples, transferability when transferring the transfer layer onto the PVC card was evaluated according to the following evaluation criteria. The transfer failure area (%) refers to the proportion of the area where there was no transfer, when the area of the transfer layer that should otherwise be transferred is taken as 100%. The evaluation results are also shown in Table 2.

"Evaluation Criteria"

A: The transfer layer is completely transferred (transfer failure area is 0%).

B: Slight transfer failure occurs only at the edge of the card (transfer failure area is less than 1%).

C: A little transfer failure occurs (transfer failure area is not less than 1% and less than 25%).

NG (1): Much transfer failure occurs (transfer failure area is not less than 25% and less than 50%).

NG (2): Significant transfer failure occurs (transfer failure area is not less than 50%).

(Durability Evaluation)

The prints of the Examples and Comparative Examples formed above were subjected to a 250-cycle wear test by a Taber test method in accordance with ANSI-INCITS 322-2002, 5.9 Surface Abrasion using a Taber abrasion tester wherein a wear ring CS-10F was used under a load of 500 gf at 60 cycles/min. The state of the prints after the wear test was visually observed, and the durability of the prints was evaluated according to the following evaluation criteria. The evaluation results are also shown in Table 2.

"Evaluation Criteria"

A: Completely no scratches on the image.

B: Slight scratches are created on the image but can be barely observed visually.

C: Scratches that can be observed visually are created on the image but are not problematic for practical use.

NG (1): Scratches that can be visually observed are created considerably on the image.

NG (2): Significant scratches are observed on the image.

TABLE 2

| | When printing density is 1.8 | | | | |
|---|---|---|---|---|---|
| | Printing voltage (V) | Applied energy (mJ/dot) | Releasability evaluation | Transferability evaluation | Durability evaluation |
| Example 1 | 17.0 | 0.22 | A | B | B |
| Example 2 | 17.0 | 0.22 | A | A | A |
| Example 3 | 17.0 | 0.22 | B | A | A |
| Example 4 | 17.0 | 0.22 | A | C | C |
| Example 5 | 19.0 | 0.28 | A | B | B |
| Example 6 | 19.0 | 0.28 | A | A | A |
| Example 7 | 19.0 | 0.28 | A | C | A |
| Example 8 | 19.0 | 0.28 | B | A | A |
| Example 9 | 19.0 | 0.28 | B | A | A |
| Example 10 | 19.0 | 0.28 | B | A | A |
| Example 11 | 17.0 | 0.22 | A | A | A |
| Example 12 | 17.0 | 0.22 | A | A | A |
| Example 13 | 19.0 | 0.28 | B | A | A |
| Example 14 | 17.0 | 0.22 | A | A | A |
| Example 15 | 19.0 | 0.28 | A | A | A |
| Example 16 | 17.0 | 0.22 | A | B | B |
| Comparative Example 1 | 21.0 | 0.34 | NG | NG (1) | NG (1) |
| Comparative Example 2 | 21.0 | 0.34 | NG | NG (1) | NG (1) |

TABLE 2-continued

| | When printing density is 1.8 | | | | |
|---|---|---|---|---|---|
| | Printing voltage (V) | Applied energy (mJ/dot) | Releasability evaluation | Transferability evaluation | Durability evaluation |
| Comparative Example 3 | 21.0 | 0.34 | NG | NG (2) | NG (2) |
| Comparative Example 4 | 21.0 | 0.34 | NG | NG (1) | NG (1) |
| Comparative Example 5 | 21.0 | 0.34 | NG | NG (1) | NG (1) |

REFERENCE SIGNS LIST

1 Substrate
2 Primer layer
3 Colorant layer
5, 55 Back face layer
10 Thermal transfer sheet
51 Another substrate
52 Release layer
53 Receiving layer
50 Transfer layer
60 Intermediate transfer medium
100 Transfer receiving article
200 Print

The invention claimed is:

1. A combination of a thermal transfer sheet and an intermediate transfer medium,
the thermal transfer sheet comprising a substrate, a primer layer, and a colorant layer, wherein the primer layer and the colorant layer are layered in this order on one surface of the substrate, and wherein the primer layer contains one or more selected from the group consisting of particles derived from colloidal inorganic particles, polyvinyl alcohol resins, polyvinyl pyrrolidone resins, and polyurethane resins, and
the intermediate transfer medium comprising another substrate, a protective layer, and a receiving layer, wherein the protective layer and the receiving layer are layered in this order on one surface of the another substrate.

2. The combination of a thermal transfer sheet and an intermediate transfer medium according to claim 1, wherein the receiving layer of the intermediate transfer medium contains a resin having a number average molecular weight (Mn) of not less than 6000 and not more than 35000.

3. The combination of a thermal transfer sheet and an intermediate transfer medium according to claim 1, wherein the receiving layer of the intermediate transfer medium contains a resin having a glass transition temperature (Tg) of not less than 60° C. and not more than 100° C.

4. The combination of a thermal transfer sheet and an intermediate transfer medium according to claim 1, wherein the receiving layer of the intermediate transfer medium contains a release agent in an amount of not more than 15% by mass on a basis of a total mass of the receiving layer.

5. A print forming method comprising:
providing: a thermal transfer sheet comprising a substrate, a primer layer, and a colorant layer, wherein the primer layer and the colorant layer are layered in this order on one surface of the substrate; an intermediate transfer medium comprising another substrate, a protective layer, and a receiving layer, wherein the protective layer and the receiving layer are layered in this order on one surface of the another substrate; and a transfer receiving article;
forming a thermal transfer image: transferring a colorant contained in the colorant layer of the thermal transfer sheet onto the receiving layer of the intermediate transfer medium to form a thermal transfer image on the receiving layer; and
forming a print: transferring the receiving layer, on which the thermal transfer image has been formed, onto the transfer receiving article together with the protective layer,
wherein the primer layer of the thermal transfer sheet used to form the thermal transfer image contains one or more selected from the group consisting of particles derived from colloidal inorganic particles, polyvinyl alcohol resins, polyvinyl pyrrolidone resins, and polyurethane resins.

6. The print forming method according to claim 5, wherein the receiving layer of the intermediate transfer medium contains a resin having a number average molecular weight (Mn) of not less than 6000 and not more than 35000.

7. The print forming method according to claim 5, wherein the receiving layer of the intermediate transfer medium contains a resin having a glass transition temperature (Tg) of not less than 60° C. and not more than 100° C.

8. The print forming method according to claim 5, wherein the receiving layer of the intermediate transfer medium contains a release agent in an amount of not more than 15% by mass on a basis of a total mass of the receiving layer.

* * * * *